(12) United States Patent
Tsuchida et al.

(10) Patent No.: US 7,816,419 B2
(45) Date of Patent: Oct. 19, 2010

(54) PHOTOCURABLE AND THERMOSETTING COATING COMPOSITION AND ARTICLE HAVING CURED COATING OF SUCH COATING COMPOSITION

(75) Inventors: Kazuhiro Tsuchida, Annaka (JP); Masaaki Yamaya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 288 days.

(21) Appl. No.: 11/976,317

(22) Filed: Oct. 23, 2007

(65) Prior Publication Data

US 2008/0097066 A1 Apr. 24, 2008

(30) Foreign Application Priority Data

Oct. 24, 2006 (JP) ............................. 2006-288607

(51) Int. Cl.
*C08F 283/12* (2006.01)
(52) U.S. Cl. ............................. 522/99; 528/32; 528/36; 528/42; 526/279; 526/321; 526/328
(58) Field of Classification Search .................. None
See application file for complete search history.

(56) References Cited

U.S. PATENT DOCUMENTS 6,846,568 B2 * 1/2005 Yamaya et al. .............. 428/447
2003/0024432 A1 2/2003 Chung et al.

2006/0052567 A1 * 3/2006 Saito et al. .................... 528/25

FOREIGN PATENT DOCUMENTS

| JP | 4-28722 | * | 1/1992 |
| JP | 2002-363414 A | | 12/2002 |
| JP | 2004-143449 A | | 5/2004 |
| JP | 2005-179587 A | | 7/2005 |
| WO | WO 2004/085501 | * | 10/2004 |

* cited by examiner

*Primary Examiner*—Marc S Zimmer
(74) *Attorney, Agent, or Firm*—Birch, Stewart, Kolasch & Birch, LLP

(57) ABSTRACT

A photocurable and thermosetting coating composition which is solventless and liquid at room temperature is provided. This coating composition provides scratch resistance, crack resistance, smudge resistance, and removability of oil-base felted markers by wiping with the underlying substrate, and this coating composition contains a silicone resin represented by:

$$(R^1R^2R^3SiO_{1/2})_a(R^4R^5SiO_{2/2})_b(R^6SiO_{3/2})_c(SiO_{4/2})_d(O_{1/2}X)_e \quad (1)$$

wherein X is hydrogen atom or an alkyl group; $R^1$ to $R^6$ are respectively at least one monovalent organic group which is a monovalent aliphatic hydrocarbon group or a monovalent aromatic hydrocarbon group optionally substituted with a substituent such as a poly(hexafluoropropylene oxide) structure-containing group; a, b, d, and e are 0 or a positive number; c is a positive number; and a+b+c+d is 1. The silicone resin contains at least one group represented by:

$$CH_2=C(R^7)COOCH_2— \quad (2)$$

wherein $R^7$ is hydrogen atom or methyl group.

8 Claims, No Drawings

PHOTOCURABLE AND THERMOSETTING COATING COMPOSITION AND ARTICLE HAVING CURED COATING OF SUCH COATING COMPOSITION

CROSS-REFERENCE TO RELATED APPLICATION

This non-provisional application claims priority under 35 U.S.C. §119(a) on Patent Application No. 2006-288607 filed in Japan on Oct. 24, 2006, the entire contents of which are hereby incorporated by reference.

TECHNICAL FIELD

This invention relates to a solventless photocurable and thermosetting coating composition used for coating and other applications, and an article having a cured coating of such coating composition. More specifically, this invention relates to a solventless photocurable and thermosetting coating composition which is capable of forming a hard protective coating having a high scratch resistance as well as excellent smudge resistance, and an article having a cured coating of such coating composition.

BACKGROUND ART

Synthetic resins such as polymethyl methacrylate resin, polycarbonate resin, polystyrene resin, cyclic polyolefin resin, polyethylene terephthalate resin, and triacetyl cellulose resin have advantageous properties including light weight, high transparency, and high workability, and therefore, these synthetic resins are recently finding wide applications in the field of optical disks such as CD and DVD, display windows of liquid crystal and EL panels, and various functional films.

In order to improve scratch resistance of such surface, a transparent hard coating having scratch resistance is generally formed on the medium on the side of the read and/or write beam incidence. The hard coat is formed by coating the surface of the medium with a composition containing a compound having at least two photoreactive groups such as vinyl group and (meth)acryl group in the molecule, a siloxane compound having a basket structure produced by hydrolyzing and condensing an alkoxysilane having a photoreactive group such as vinyl group and (meth)acryl group in the presence of a basic catalyst (JP-A 2002-363414 and JP-A 2004-143449: Patent Documents 1 and 2), and a reaction product of an alkoxysilane having a photoreactive group and a colloidal silica; and curing the thus formed coating by irradiating with an active energy beam such as UV beam. However, the photoreactive group mainly employed in these hard coating had been (meth)acryloxypropyl group, and accordingly, the scratch resistance was insufficient, and the resistance to smudges such as fingerprints and removability of oil-base felted markers by wiping could not be expected.

JP-A 2005-179587 (Patent Document 3) discloses use of a siloxane compound containing (meth)acryl group for the photoreactive group in the silica based coating. However, the siloxane compound is used in this case not for the production of a coating composition for forming a hard coating, but for the formation of a low k interlayer dielectrics having flatness. More specifically, the siloxane compound is used for the purpose of forming voids in the layer by curing the siloxane compound and decomposing and removing the organic group by heating, UV/EB irradiation, or plasma treatment.

When such products are used, various types of smudges and fingerprints deposit on the surface of such resin, and since such smudge and fingerprint deposition is not preferable, the surface of an optical information medium is often subjected to an adequate surface treatment to thereby improve the smudge proof property, reduce fingerprint deposition, and improve removal of the fingerprints. For example, attempts have been made to provide a variety of water and oil repellent treatments on the surface of an optical information medium.

With regard to improvement of smudge proof property, Japanese Patent No. 3603133 (Patent Document 4) discloses a siloxane compound having a basket structure produced by hydrolyzing and condensing an alkoxysilane having a polymerizable functional group and an alkoxysilane having a perfluoroalkyl group in the presence of a basic catalyst. The coating formed by curing a composition containing this compound has an increased contact angle with oleic acid, and improvement in the smudge proof property is expectable. This coating, however, suffers from insufficient removability of oil-base felted markers by wiping as well as a markedly reduced abrasion resistance.

DISCLOSURE OF THE INVENTION

The present invention has been completed in view of the situation as described above, and an object of the present invention is to provide a solventless photocurable and thermosetting coating composition which is capable of forming a protective coating on the supporting substrate, so that the thus formed protective coating is capable of providing its supporting substrate with a scratch resistance and crack resistance, and also, a resistance to fingerprints and other smudges as well as removability of oil-base felted markers by wiping. Another object of the present invention is to provide an article having a coating formed by applying and curing such coating composition.

In order to realize such objects, the inventors of the present invention made an intensive study and found that a solventless photocurable and thermosetting coating composition containing a silicone resin represented by the siloxane unit of the formula (1) as described below is capable of providing its supporting substrate with a scratch resistance and crack resistance, and also, a resistance to fingerprints and other smudges as well as removability of oil-base felted markers by wiping. The present invention has been completed on the basis of such finding.

Accordingly, the present invention provides a photo- and thermo-curable coating composition and an article having formed thereon a coating by curing such composition.

[1] A photocurable and thermosetting coating composition which is solventless and liquid at room temperature containing a silicone resin represented by a siloxane unit of the following formula (1):

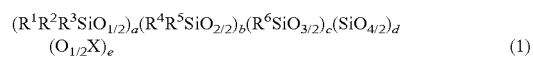

wherein X is hydrogen atom or an alkyl group containing 1 to 4 carbon atoms; $R^1$ to $R^6$ are respectively at least one monovalent organic group which is a monovalent aliphatic hydrocarbon group containing 1 to 6 carbon atoms or a monovalent aromatic hydrocarbon group containing 6 to 10 carbon atoms optionally substituted with a substituent selected from phenyl group, fluorine atom, chlorine atom, bromine atom, (meth) acryloxy group, epoxy structure-containing group, mercapto group, isocyanate group, amino functional group, perfluoroalkyl group, and poly(hexafluoropropylene oxide) structure-containing group; with the proviso that at least one of the $R^1$ to $R^6$ is a group represented by the following formula (2):

$$CH_2=C(R^7)COOCH_2- \quad (2)$$

wherein $R^7$ is hydrogen atom or methyl group; and that the amount of the siloxane unit substituted by the organic group represented by the formula (2) is 20 to 100% by mole of all siloxane units; a is on average $0 \leq a < 0.4$; b is on average $0 \leq b < 0.5$; c is on average $0 < c \leq 1$; d is on average $0 \leq d < 0.4$; e is on average $0 \leq e < 0.2$; and $a+b+c+d=1$.

[2] The coating composition according to [1] wherein, when content of the siloxane unit containing the organic group represented by the formula (2) is A % by mole, and content of the siloxane unit containing the organic group represented by the formula (3):

$$CH_2=C(R^8)COOC_3H_6- \quad (3)$$

wherein $R^8$ is hydrogen atom or methyl group is B % by mole, $$0.5 < A/(A+B) \leq 1.$$

[3] The coating composition according to [1] or [2] wherein the silicone resin has a weight average molecular weight of 1,000 to 5,000.

[4] The coating composition according to any one of [1] to [3] wherein the silicone resin has a silanol group content of up to 2% by weight.

[5] The coating composition according to any one of [1] to [4] wherein the silicone resin has a volatile content of less than 1% by weight.

[6] The coating composition according to any one of [1] to [5] wherein the silicone resin contains a siloxane unit substituted by a group containing poly(hexafluoropropylene oxide) structure at an amount of 0.1 to 20% by mole of all siloxane units.

[7] The coating composition according to any one of [1] to [6] wherein the silicone resin contains a siloxane unit substituted by methyl group at an amount of 1 to 10% by mole of all siloxane units.

[8] The coating composition according to any one of [1] to [7] further comprising a polyfunctional (meth)acryl compound.

[9] The coating composition according to any one of [1] to [8] further comprising at least one member selected from photocuring catalyst, radical polymerization catalyst, and thermal condensation catalyst.

[10] An article having formed thereon a coating formed by applying and curing the coating composition of [9].

In the present invention, the term "solventless" means that the coating composition does not contain a solvent which is non-reactive and not curing under the curing conditions of the present invention and which is capable of dissolving the silicone resin of the present invention.

EFFECTS OF THE INVENTION

The solventless photocurable and thermosetting coating composition of the present invention contains a siloxane unit containing acryloxymethyl group for its main ingredient, and accordingly, the distance between the points of crosslinking is reduced with the increase in the crosslinking density, and consequently, the resulting cured coating is improved in the abrasion resistance and the heat resistance.

DESCRIPTION OF THE PREFERRED EMBODIMENTS

Next, the present invention is described in further detail.

The silicone resin which is used as the main ingredient of the solventless photocurable and thermosetting coating composition of the present invention is represented by a siloxane unit of the following formula (1):

$$(R^1R^2R^3SiO_{1/2})_a(R^4R^5SiO_{2/2})_b(R^6SiO_{3/2})_c(SiO_{4/2})_d(O_{1/2}X)_e \quad (1)$$

wherein X is hydrogen atom or an alkyl group containing 1 to 4 carbon atoms; $R^1$ to $R^6$ are respectively at least one monovalent organic group which is a monovalent aliphatic hydrocarbon group containing 1 to 6 carbon atoms or a monovalent aromatic hydrocarbon group containing 6 to 10 carbon atoms optionally substituted with a substituent selected from phenyl group, fluorine atom, chlorine atom, bromine atom, (meth)acryloxy group, epoxy structure-containing group, mercapto group, isocyanate group, amino functional group, perfluoroalkyl group, and poly(hexafluoropropylene oxide) structure-containing group; with the proviso that at least one of the $R^1$ to $R^6$ is a group represented by the following formula (2):

$$CH_2=C(R^7)COOCH_2- \quad (2)$$

wherein $R^7$ is hydrogen atom or methyl group; and that the amount of the siloxane unit substituted by the organic group represented by the formula (2) is 20 to 100% by mole in relation to the entire siloxane unit; a is on average $0 \leq a < 0.4$; b is on average $0 \leq b < 0.5$; c is on average $0 < c \leq 1$; d is on average $0 \leq d < 0.4$; e is on average $0 \leq e < 0.2$; and $a+b+c+d=1$.

The silicone resin constituting the coating composition may be the one represented by the siloxane unit of the formula: $(R^6SiO_{3/2})_c(OX)_e$, $(R^6SiO_{3/2})_c(SiO_{4/2})_d(OX)_e$, $(R^1R^2R^3SiO_{1/2})_a(R^6SiO_{3/2})_c(OX)_e$, $(R^4R^5SiO_{2/2})_b(R^6SiO_{3/2})_c(OX)_e$, $(R^4R^5SiO_{2/2})_b(R^6SiO_{3/2})_c(SiO_{4/2})_d(OX)_e$, $(R^1R^2R^3SiO_{1/2})_a(R^6SiO_{3/2})_c(SiO_{4/2})_d(OX)_e$, or $(R^1R^2R^3SiO_{1/2})_a(R^4R^5SiO_{2/2})_b(R^6SiO_{3/2})_c(OX)_e$ since a, b, and d can be 0 in the formula (1) of the siloxane unit. The silicone resin is a branched, network, or three dimensional organopolysiloxane resin comprising these siloxane units, and due to the presence of the (meth)acryloxy group, it undergoes a rapid curing when exposed to a high energy beam such as UV beam or heat in the co-presence of a photopolymerization or thermal polymerization initiator.

"a", "b", "c", and "d" indicate average molar amount of each siloxane unit and the total molar amount of the siloxane units is 1. In other words, "a", "b", "c", and "d" indicate average content (t by mole) of each siloxane unit in one molecule, and accordingly, $a+b+c+d=1$. "e" indicates average percentage (% by mole) of the siloxane unit having a hydrolyzable group bonded to the silicon in the D to Q siloxane units. Accordingly, $0 \leq e < (b+c+d)$.

Introduction of an M unit ($R^1R^2R^3SiO_{1/2}$) in the organopolysiloxane resin generally result in a decrease of the molecular weight, and therefore, the M unit is typically introduced at $0 \leq a < 0.4$, and preferably at $0 \leq a < 0.2$ on average. Introduction of a D unit ($R^4R^5SiO_{2/2}$) results in a decrease of the degree of branching in the resin, and the cured product will have a reduced modulus with an improved crack resistance or smudge proof property, and therefore, the D unit is typically introduced at $0 \leq b < 0.5$, and preferably at $0 < b < 0.02$ on average. Introduction of a T unit ($R^6SiO_{3/2}$) generally results in an increase in the degree of branching and the cured product will have an increased modulus with an improved abrasion resistance, and therefore, the T unit is typically introduced at 0<c≦1, and preferably at 0.8≦c≦1. Introduction of a Q unit ($SiO_{4/2}$) generally results in a significant increase in the degree of branching and the cured product will have a significantly increased modulus with reduced crack resistance, and therefore, the Q unit is typically introduced at 0≦d<0.4 on average, and preferably, d=0. Introduction of the siloxane unit containing a hydrolyzable group results in the increased hardness by the thermal condensation while storage stability is reduced due to the reactive group remaining in the resin. Accordingly, e is typically 0≦e<0.2, and more preferably 0≦e<0.1 on average.

Of the substituents $R^1$ to $R^6$ bonded to the silicon atom in the siloxane unit of formula (1), the monovalent aliphatic hydrocarbon group which may have a substituent containing 1 to 6 carbon atom atoms may be, for example, methyl group, ethyl group, propyl group, butyl group, pentyl group, hexyl group, and cyclohexyl group. The monovalent aromatic hydrocarbon group containing 6 to 10 carbon atoms may be, for example, phenyl group, tolyl group, phenylethyl group, xylyl group, or naphthyl group. Exemplary substituents include phenyl group, fluorine atom, chlorine atom, bromine atom, (meth)acryloxy group, epoxy structure-containing group, mercapto group, isocyanate group, amino functional group, perfluoroalkyl group, and a group containing poly(hexafluoropropylene oxide) structure. Among these, at least one of the $R^1$ to $R^6$ is the organic group represented by the formula (2):

$$CH_2=C(R^7)COOCH_2— \qquad (2)$$

wherein $R^7$ is hydrogen atom or methyl group. (In other words, at least one of the organic groups bonding to the silicon atom in the silicone resin is the group represented by the formula (2)). $R^7$ is preferably hydrogen atom in consideration of the curability upon irradiation by a high energy beam such as UV beam. The siloxane unit substituted by the organic group represented by the formula (2) is preferably included at 35 to 100% by mole, and more preferably included at 70 to 100% by mole in relation to total siloxane unit.

In the hydrolyzable group bonded to the silicon atom, X is hydrogen atom or an alkyl group containing 1 to 4 carbon atoms such as methyl group, ethyl group, n-propyl group, i-propyl group, n-butyl group, i-butyl group, and t-butyl group, and preferably, hydrogen atom or methyl group, and more preferably hydrogen atom.

Of the substituents $R^1$ to $R^6$ bonded to the silicon atom in the siloxane unit of formula (1), the photoreactive group may be, for example, the organic group represented by the formula (2), or an organic group represented by the formula (3):

$$CH_2=C(R^8)COOC_3H_6— \qquad (3)$$

wherein $R^8$ is hydrogen atom or methyl group, in consideration of the curability upon irradiation by a high energy beam such as UV beam. $R^8$ is preferably hydrogen atom in consideration of the curability upon irradiation by a high energy beam such as UV beam. The siloxane unit containing the organic group represented by the formula (2) is preferably included so that content of the siloxane unit containing the organic group represented by the formula (2) (A % by mole) and content of the siloxane unit containing the organic group represented by the formula (3) (B % by mole) are in the relation: 0.5<A/(A+B)≦1, and more preferably, 0.75<A/(A+B)≦1. When the content is outside such range, increase in the crosslinking density which is the effect to be realized in the present invention will be insufficient, and sufficient abrasion resistance may not be achieved.

The siloxane unit substituted with the organic group represented by the formula (3) is preferably included at 0 to 35% by mole, and more preferably at 0 to 23% by mole.

In the siloxane unit of the formula (1), content of the siloxane unit substituted with the group containing a poly(hexafluoropropylene oxide) structure is preferably 0.1 to 20% by mole, and more preferably 1 to 5% by mole of all siloxane units in view of improving the anti-smudge effects. Exemplary poly(hexafluoropropylene oxide) structures include $C_3F_7OC(CF_3)$ $FCF_2OC(CF_3)$ $FCH_2OC_3H_6—$ and $F(C(CF_3)FCF_2O)_6C(CF_3)FC(=O)NHC_3H_6—$.

In the siloxane unit of the formula (1), content of the dimethylsiloxane unit is preferably 0.1 to 10% by mole, and more preferably 0.1 to 3% by mole of all siloxane units in view of improving the resistance to oil-base felted markers. When the content is less than such range, the resistance to oil-base felted markers will be insufficient, while excessive content may result in the failure of realizing the sufficient abrasion resistance.

When the silicone resin contains any one of the siloxane unit substituted by the organic group represented by the formula (3) (siloxane unit S-2), the siloxane unit substituted by the group containing a poly(hexafluoropropylene oxide) (siloxane unit S-3), and dimethylsiloxane unit S-4 in addition to the siloxane unit substituted by the organic group represented by the formula (2) (siloxane unit S-1), content of the siloxane unit S-1 is typically 35 to 99.8% by mole, and in particular, 70 to 98.9% by mole.

Exemplary non-limiting (meth)acryloxy group-containing organopolysiloxane resins (silicone resins) include an organopolysiloxane resin comprising ($Me_2SiO_{2/2}$), ($AlSiO_{3/2}$), ($HFPO3SiO_{3/2}$), and ($O_{1/2}H$) units; an organopolysiloxane resin comprising ($AlSiO_{3/2}$) and ($O_{1/2}H$) units; an organopolysiloxane resin comprising ($A2MeSiO_{2/2}$), ($AlSiO_{3/2}$), and ($O_{1/2}H$) units; an organopolysiloxane resin comprising ($AlSiO_{3/2}$), ($A2SiO_{3/2}$), and ($O_{1/2}H$) units; an organopolysiloxane resin comprising ($AlSiO_{3/2}$), ($MeSiO_{3/2}$), and ($O_{1/2}H$) units; an organopolysiloxane resin comprising ($AlSiO_{3/2}$), ($HFPO3SiO_{3/2}$), and ($O_{1/2}H$) units [wherein Me represents methyl group, A1 represents acryloxymethyl group, A2 represents 3-acryloxypropyl group, and HFPO3 represents and organic group represented by $C_3F_7OC(CF_3)FCF_2OC(CF_3)FCH_2OC_3H_6—$].

The silicone resin represented by the siloxane unit of the formula (1) of the present invention as described above preferably has a weight average molecular weight as measured by gel permeation chromatography (GPC) in term of polystyrene of 1,000 to 5,000, and more preferably 1,200 to 3,000. When the molecular weight is less than 1,000, condensation will be insufficient to result in the unacceptable storage stability, and the surface of the coating may exhibit repellency due to the remaining unreacted siloxane unit. When the molecular weight is in excess of 5,000, viscosity will be unduly high to detract from handling convenience.

In addition, the resulting silicone resin may preferably have a silanol group content of up to 2% by weight, and more preferably up to 1% by weight. The content of the silanol group in excess of 2% by weight may result in the problems such as insufficient storage stability.

Furthermore, the resulting silicone resin may preferably have a content of volatile components including the organic solvent of less than 1% by weight.

When the silicone resin is liquid at room temperature (25° C.), it may preferably have a viscosity as measured by rotary viscometer of 1,500 to 3,000 mP·a.

The coating composition containing the organopolysiloxane resin (silicone resin) represented by the siloxane unit of the formula (1) of the present invention may optionally contain a polyfunctional (meth)acrylate as a reactive diluent. When such polyfunctional (meth)acrylate is not incorporated, stable production may become difficult, and coating to the underlying substrate may become extremely difficult due to the solidification (crystallization) of the organopolysiloxane resin.

The polyfunctional (meth)acrylate forms a matrix of the coating after its curing. A polyfunctional (meth)acrylate is a compound having at least two (meth)acryl groups in its molecule, and non-limiting examples include 1,6-hexanediol di(meth)acrylate, triethylene glycol di(meth)acrylate, ethylene oxide-modified bisphenol A di(meth)acrylate, trimethylolpropane tri(meth)acrylate, pentaerythritol tetra(meth)acrylate, ditrimethylolpropane tetra(meth)acrylate, dipentaerythritol hexa(meth)acrylate, pentaerythritol tri(meth)acrylate, 3-(meth)acryloyloxy glycerin mono(meth)acrylate, urethane acrylate, epoxy acrylate, and ester acrylate, which may be used alone or in combination of two or more.

The polyfunctional (meth)acrylate is preferably incorporated at a content of 0 to 100 parts by weight, and in particular, 0 to 70 parts by weight in relation to 100 parts by weight of the silicone resin. Incorporation of excessive polyfunctional (meth)acrylate may result in an insufficient abrasion resistance. When a polyfunctional (meth)acrylate is incorporated, incorporation of at least 10 parts by weight is preferable in view of the effectiveness of the incorporation.

The photocurable and thermosetting coating composition is produced by mixing the coating composition containing the organopolysiloxane resin (silicone resin) represented by the siloxane unit of the formula (1) and the optionally incorporated polyfunctional (meth)acrylate with the curing catalyst, and the resulting composition cures when exposed to a high energy beam such as UV beam or heat.

The curing catalyst may be a radical initiator and/or a thermal condensation catalyst.

The radical initiator may be selected from those commonly used in the art such as acetophenone, benzoin, benzophenone, and thioxanthone radical initiators, and exemplary radical initiators include Dalocure 1173, Irgacure 651, Irgacure 184, and Irgacure 907 (all of these being manufactured by Ciba Specialty Chemicals).

Thermal condensation catalyst may be adequately selected from those known in the art, and examples of the condensation catalyst used in the present invention include basic compounds such as lithium hydroxide, sodium hydroxide, potassium hydroxide, sodium methylate, sodium acetate, sodium formate, n-hexylamine, tributylamine, and diazabicycloundecene; metal-containing compounds such as tetraisopropyl titanate, tetrabutyl titanate, aluminum triisobutoxide, aluminum triisopropoxide, aluminum acetylacetonate, aluminum perchlorate, aluminum chloride, cobalt octylate, cobalt acetylacetonate, zinc octylate, zinc acetylacetonate, iron acetylacetonate, tin acetylacetonate, dibutyltin octylateoctylate, and dibutyltin dilaurate; and acidic compounds such as p-toluenesulfonic acid, and trichloroacetic acid.

The curing catalyst may be typically incorporated at 0.1 to 15 parts by weight, and preferably at 0.5 to 10 parts by weight in relation to 100 parts by weight of the silicone resin and the polyfunctional (meth)acrylate. Incorporation at a content of less than 0.1 parts by weight may result in an insufficient curability while incorporation at a content in excess of 15 parts by weight may result in the reduced surface hardness.

The coating composition of the present invention containing organopolysiloxane resin (silicone resin) represented by siloxane unit formula (1) may optionally contain additives such as metal oxide fine particles, silane coupling agent, non-polymerizable dilution solvent, polymerization inhibitor, antioxidant, UV absorbent, light stabilizer, antifoaming agent, and leveling agent.

The metal oxide fine particles may be fine particles of oxide of Si, Ti, Al, Zn, Zr, In, Sn, Sb, and the like and complex oxides thereof, whose surface is optionally coated with silica, alumina, or the like. Exemplary metal oxide fine particles include fine particles of silica, alumina, zirconia, and titania, and the preferred are fine particles of silica. Addition of such metal oxide fine particles results in the improvement of various properties including the abrasion resistance.

The silica fine particles used may be hollow or porous silica fine particles which are expected to reduce the refractive index.

Among the silica fine particles as described above, the preferred are those surface modified with a hydrolyzable silane compound having a group which is reactive to an active energy beam since such reactive silica fine particles will be secured to the interior of the polymer matrix by undergoing a crosslinking reaction by exposure to an active energy beam.

Preferably, the fine metal oxide particles such as fine silica particles may be incorporated at a content of 5 to 100 parts by weight in relation to 100 parts by weight of the total content of the silicone resin and the polyfunctional (meth)acrylate.

By coating and subsequently curing the coating, the photo- and thermo-curable resin composition of the present invention is capable of providing scratch resistance, crack resistance, smudge proof property for smudges such as fingerprints, and removability of oil-base felted markers by wiping with the article which needs a smudge proof coating on its surface, in particular, on the surface of an optical information medium such read-only optical disk, optical recording disk, or magnetooptical recording disk, and more specifically, on the surface of such medium on the side of the incidence of the write or read beam, on surface of an optical lens, optical filter, or anti-reflection film, or on the surface of a display device such as liquid crystal display, CRT display, plasma display, or EL display. The article having such cured coating will be provided with improved smudge proof property and lubricity as well as excellent scratch resistance and abrasion resistance.

The coating of the photo- and thermo-curable resin composition may be formed, for example, by spin coating.

The coating formed preferably has a thickness of 0.1 to 50 $\mu$m, and in particular, 0.5 to 30 $\mu$m. When the coating is too thin, the coating may have an insufficient abrasion resistance, and an excessively thick coating may suffer from reduced crack resistance.

The source of light beam used for curing the coating composition is typically a source including the light at a wavelength in the range of 200 to 450 nm, for example, high pressure mercury vapor lamp, ultrahigh pressure mercury vapor lamp, metal halide lamp, xenon lamp, and carbon ark lamp. Although the dose is not particularly limited, exposure to 10 to 5,000 mJ/cm$^2$, and in particular, to 20 to 1,000 mJ/cm$^2$ is preferable. The curing time is typically 0.5 seconds to 2 minutes, and preferably 1 second to 1 minute.

The curing of the coating composition at an elevated temperature is preferably conducted at a temperature in the range of 30 to 250° C. for 1 to 120 minutes, and more preferably, the curing is conducted at a temperature of 60 to 150° C. for reducing the time required for curing simultaneously with the prevention of the damage to the substrate.

EXAMPLES

Next, the present invention is described in detail by referring to the Examples and Comparative Examples, which by no means limit the scope of the present invention. In the following description, "Me" stands for "methyl".

Resistance to oil-base felted marker was evaluated by drawing a line on a cured coating with a commercially available oil-base felted marker, wiping the line with a cloth, and observing the degree of removal by the wiping.

Smudge proof property was measured by evaluating contact angle with water and contact angle with oleic acid using a contact angle meter (CA-X150 manufactured by Kyowa Interface Science). (A larger contact angle indicates better smudge proof property.)

Scratch resistance and abrasion resistance were measured according to ASTM D 1044 by conducing abrasion test of the cured coating using Taber abrasion tester (using abrasion wheel CS-10F), measuring turbidity of the cured coating before and after the abrasion test using a turbidimeter (NDH2000 manufactured by Nippon Denshoku Industries Co., Ltd.), and calculating ΔHaze, namely, [(turbidity after the abrasion test)−(turbidity before the abrasion test)]. (The scratch resistance and the abrasion resistance were evaluated "good" when the ΔHaze was 15 or less.)

Example 1

Synthesis of Acryloxymethyl Group-Containing Organopolysiloxaneresin (AM1)

206.0 parts by weight (1.00 mole) of acryloxymethyltrimethoxysilane and 539.7 parts by weight of isopropyl alcohol used for the starting materials were charged in the reaction vessel, and when these materials were homogeneously mixed, 12.6 parts by weight of 20% by weight methanol solution of tetramethyl ammonium hydroxide and 108.8 parts by weight of water (6.04 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product had a volatile content of 0.7% by weight, a refractive index of 1.4882, an OH content of 1.0% by weight, and a weight average molecular weight of 1,500, and it was solid at 25° C. Analysis by infrared absorption spectrometry and nuclear magnetic resonance revealed that the hydrolysis and condensation had proceeded in theoretical manner, and the resulting product was an organopolysiloxane resin containing a photoreactive group comprising the siloxane unit represented by the formula:

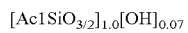

[$Ac1SiO_{3/2}$]$_{1.0}$[OH]$_{0.07}$

[wherein Ac1 represents acryloxymethyl].

50 parts by weight of the resulting compound, 50 parts by weight of 1,6-hexanediol diacrylate (a difunctional acrylate), and 5 parts by weight of Dalocure 1173 (product name of a radical initiator manufactured by Ciba Specialty Chemicals) were mixed, and the resulting composition containing no solvent which is liquid at 25° C. was coated on a polycarbonate sheet to a thickness of 5 μm, and the coating was irradiated with a 80 W high-pressure mercury-vapor lamp for 2 seconds (accumulated radiation dose, 200 mJ/cm$^2$) for curing.

The resulting coating exhibited high abrasion resistance with a ΔHaze of 5 in Taber abrasion test (at a load of 500 g and a rotation of 100), and a contact angle with water of 77°.

Example 2

Synthesis of Acryloxymethyl Group-Containing Organopolysiloxane resin (AM2)

164.8 parts by weight (0.80 mole) of acryloxymethyltrimethoxysilane, 46.8 parts by weight (0.20 mole) of 3-acryloxypropyltrimethoxysilane, and 569.7 parts by weight of isopropyl alcohol used for the starting materials were charged in the reaction vessel, and when these materials were homogeneously mixed, 13.1 parts by weight of 20% by weight methanol solution of tetramethyl ammonium hydroxide and 108.8 parts by weight of water (6.04 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product was liquid at 25° C., and it had a volatile content of 0.8% by weight, a refractive index of 1.4860, an OH content of 0.4% by weight, and a weight average molecular weight of 2,000. Analysis by infrared absorption spectrometry and nuclear magnetic resonance of this reaction product revealed that the hydrolysis and condensation had proceeded in theoretical manner, and the resulting product was an organopolysiloxane resin containing a photoreactive group comprising the siloxane unit represented by the formula:

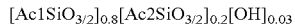

[$Ac1SiO_{3/2}$]$_{0.8}$[$Ac2SiO_{3/2}$]$_{0.2}$[OH]$_{0.03}$

[wherein Ac1 represents acryloxymethyl, and Ac2 represents 3-acryloxypropyl].

50 parts by weight of the resulting compound, 50 parts by weight of 1,6-hexanediol diacrylate (a difunctional acrylate), and 5 parts by weight of Dalocure 1173 (product name of a radical initiator manufactured by Ciba Specialty Chemicals) were mixed, and the resulting composition containing no solvent which is liquid at 25° C. was coated on a polycarbonate sheet to a thickness of 5 μm, and the coating was irradiated with a 80 W high-pressure mercury-vapor lamp for 2 seconds (accumulated radiation dose, 200 mJ/cm$^2$) for curing.

The resulting coating exhibited high abrasion resistance with a ΔHaze of 15 in Taber abrasion test (at a load of 500 g and a rotation of 100), and a contact angle with water of 79°.

Example 3

Synthesis of Acryloxymethyl Group-Containing Organopolysiloxane Resin (AM3)

164.8 parts by weight (0.80 mole) of acryloxymethyltrimethoxysilane, 46.3 parts by weight (0.20 mole) of 3-acryloxypropylmethyldimethoxysilane, and 539.7 parts by weight of isopropyl alcohol used for the starting materials were charged in the reaction vessel, and when these materials were homogeneously mixed, 13.2 parts by weight of 20% by weight methanol solution of tetramethyl ammonium hydroxide and 108.8 parts by weight of water (6.04 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product was liquid at 25° C., and it had a volatile content of 0.7% by weight, a refractive index of 1.4815, an OH content of 0.27% by weight, and a weight average molecular weight of 1,900. Analysis by infrared absorption spectrometry and nuclear magnetic resonance of this reaction product revealed that the hydrolysis and condensation had proceeded in theoretical manner, and the resulting product was an organopolysiloxane resin containing a photoreactive group comprising the siloxane unit represented by the formula:

$[Ac2SiO_{2/2}]_{0.02}[Ac1SiO_{3/2}]_{0.8}[OH]_{0.015}$

[wherein Ac1 represents acryloxymethyl, and Ac2 represents 3-acryloxypropyl].

100 parts by weight of the resulting compound and 5 parts by weight of Dalocure 1173 (product name of a radical initiator manufactured by Ciba Specialty Chemicals) were mixed, and the resulting composition containing no solvent which is liquid at 25° C. was coated on a polycarbonate sheet to a thickness of 5 μm, and the coating was irradiated with a 80 W high-pressure mercury-vapor lamp for 2 seconds (accumulated radiation dose, 200 mJ/cm²) for curing.

The resulting coating exhibited high abrasion resistance with a ΔHaze of 9 in Taber abrasion test (at a load of 500 g and a rotation of 100), and a contact angle with water of 700.

Example 4

Synthesis of Acryloxymethyl Group-Containing Organopolysiloxane Resin (AM4)

185.4 parts by weight (0.90 mole) of acryloxymethyltrimethoxysilane, 13.6 parts by weight (0.10 mole) of methyltrimethoxysilane, and 503.1 parts by weight of isopropyl alcohol used for the starting materials were charged in the reaction vessel, and when these materials were homogeneously mixed, 11.9 parts by weight of 20% by weight methanol solution of tetramethyl ammonium hydroxide and 108.8 parts by weight of water (6.06 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product was liquid at 25° C., and it had a volatile content of 0.5% by weight, a refractive index of 1.4849, an OH content of 1.0% by weight, and a weight average molecular weight of 2,700. Analysis by infrared absorption spectrometry and nuclear magnetic resonance of this reaction product revealed that the hydrolysis and condensation had proceeded in theoretical manner, and the resulting product was an organopolysiloxane resin containing a photoreactive group comprising the siloxane unit represented by the formula:

$[Ac1SiO_{3/2}]_{0.9}[MeSiO_{3/2}]_{0.1}[OH]_{0.07}$

[wherein Ac1 represents acryloxymethyl].

50 parts by weight of the resulting compound, 50 parts by weight of 1,6-hexanediol diacrylate (a difunctional acrylate), and 5 parts by weight of Dalocure 1173 (product name of a radical initiator manufactured by Ciba Specialty Chemicals) were mixed, and the resulting composition containing no solvent which is liquid at 25° C. was coated on a polycarbonate sheet to a thickness of 5 μm, and the coating was irradiated with a 80 W high-pressure mercury-vapor lamp for 2 seconds (accumulated radiation dose, 200 mJ/cm²) for curing.

The resulting coating exhibited high abrasion resistance with a ΔHaze of 7 in Taber abrasion test (at a load of 500 g and a rotation of 100), and a contact angle with water of 64°.

Example 5

Synthesis of Acryloxymethyl Group and Fluorine-Containing Organopolysiloxane Resin (AM5)

199.8 parts by weight (0.97 mole) of acryloxymethyltrimethoxysilane, 19.3 parts by weight (0.03 mole) of HFPO₃Si(OMe)₃ [wherein HFPO₃ represents $C_3F_7OC(CF_3)FCF_2OC(CF_3)FCH_2OC_3H_6$—], and 608.5 parts by weight of isopropyl alcohol used for the starting materials were charged in the reaction vessel, and when these materials were homogeneously mixed, 13.8 parts by weight of 20% by weight methanol solution of tetramethyl ammonium hydroxide and 97.0 parts by weight of water (6.04 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product was liquid at 25° C., and it had a volatile content of 0.3% by weight, a refractive index of 1.4722, an OH content of 1.1% by weight, and a weight average molecular weight of 1,600. Analysis by infrared absorption spectrometry and nuclear magnetic resonance of this reaction product revealed that the hydrolysis and condensation had proceeded in theoretical manner, and the resulting product was an organopolysiloxane resin containing a photoreactive group comprising the siloxane unit represented by the formula:

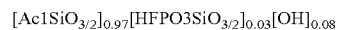
$[Ac1SiO_{3/2}]_{0.97}[HFPO3SiO_{3/2}]_{0.03}[OH]_{0.08}$

[wherein Ac1 represents acryloxymethyl and HFPO3 represents $C_3F_7OC(CF_3)FCF_2OC(CF_3)FCH_2OC_3H_6$—].

60 parts by weight of the resulting compound, 40 parts by weight of 1,6-hexanediol diacrylate (a difunctional acrylate), and 5 parts by weight of Dalocure 1173 (product name of a radical initiator manufactured by Ciba Specialty Chemicals) were mixed, and the resulting composition containing no solvent which is liquid at 25° C. was coated on a polycarbonate sheet to a thickness of 5 μm, and the coating was irradiated with a 80 W high-pressure mercury-vapor lamp for 2 seconds (accumulated radiation dose, 200 mJ/cm²) for curing.

The resulting coating exhibited high abrasion resistance with a ΔHaze of 9 in Taber abrasion test (at a load of 500 g and a rotation of 100). The coating also exhibited an acceptable resistance to oil-base felted marker. While the contact angle with water was as high as 940, the contact angle with oleic acid was 540, and the smudge proof property was insufficient.

Example 6

Synthesis of Acryloxymethyl Group and Fluorine-Containing Organopolysiloxane Resin (Am6)

199.6 parts by weight (0.96 mole) of acryloxymethyltrimethoxysilane, 19.3 parts by weight (0.03 mole) of HFPO3Si(OMe)₃ [wherein HFPO3 represents $C_3F_7OC(CF_3)FCF_2OC(CF_3)FCH_2OC_3H_6$—], 0.9 parts by weight (0.0008 mole) of permethyldodecasiloxane (hereinafter referred to as MD-10), and 612.7 parts by weight of isopropyl alcohol used for the starting materials were charged in the reaction vessel, and when these materials were homogeneously mixed, 13.9 parts by weight of 20% by weight methanol solution of tetramethyl ammonium hydroxide and 97.0 parts by weight of water (6.04 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product was liquid at 25° C., and it had a volatile content of 0.2% by weight, a refractive index of 1.4715, an OH content of 0.3% by weight, and a weight average molecular weight of 1,700. Analysis by infrared absorption spectrometry and nuclear magnetic resonance of this reaction product revealed that the hydrolysis and condensation had proceeded in theoretical manner, and the resulting product was an organopolysiloxane resin containing a photoreactive group comprising the siloxane unit represented by the formula:

$$[Me_2SiO_{2/2}]_{0.01}[Ac1SiO_{3/2}]_{0.96}[HFPO3SiO_{3/2}]_{0.03}[OH]_{0.01}$$

[wherein Ac1 represents acryloxymethyl and HFPO3 represents $C_3F_7OC(CF_3)FCF_2OC(CF_3)FCH_2OC_3H_6—$].

60 parts by weight of the resulting compound, 40 parts by weight of 1,6-hexanediol diacrylate (a difunctional acrylate), and 5 parts by weight of Dalocure 1173 (product name of a radical initiator manufactured by Ciba Specialty Chemicals) were mixed, and the resulting composition containing no solvent which is liquid at 25° C. was coated on a polycarbonate sheet to a thickness of 5 μm, and the coating was irradiated with a 80 W high-pressure mercury-vapor lamp for 2 seconds (accumulated radiation dose, 200 mJ/cm$^2$) for curing.

The resulting coating exhibited high abrasion resistance with a ΔHaze of 10 in Taber abrasion test (at a load of 500 g and a rotation of 100). The coating also exhibited an acceptable resistance to oil-base felted marker, and excellent smudge proof property with a contact angle with water of 96°, and a contact angle with oleic acid of 61°.

Example 7

Synthesis of Acryloxymethyl Group and Fluorine-Containing Organopolysiloxane Resin (Am7)

199.6 parts by weight (0.96 mole) of acryloxymethyltrimethoxysilane, 17.0 parts by weight (0.03 mole) of $C_8F_{17}C_2H_4Si(OMe)_3$, 0.9 parts by weight (0.0008 mole) of MD-10, and 612.7 parts by weight of isopropyl alcohol used for the starting materials were charged in the reaction vessel, and when these materials were homogeneously mixed, 13.9 parts by weight of 20% by weight methanol solution of tetramethyl ammonium hydroxide and 97.0 parts by weight of water (6.04 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product was liquid at 25° C., and it had a volatile content of 0.3% by weight, a refractive index of 1.4732, an OH content of 0.5% by weight, and a weight average molecular weight of 1,800. Analysis by infrared absorption spectrometry and nuclear magnetic resonance of this reaction product revealed that the hydrolysis and condensation had proceeded in theoretical manner, and the resulting product was an organopolysiloxane resin containing a photoreactive group comprising the siloxane unit represented by the formula:

$$[Me_2SiO_{2/2}]_{0.01}[Ac1SiO_{3/2}]_{0.96}[C_8F_{17}C_2H_4SiO_{3/2}]_{0.03}[OH]_{0.04}$$

[wherein Ac1 represents acryloxymethyl].

60 parts by weight of the resulting compound, 40 parts by weight of 1,6-hexanediol diacrylate (a difunctional acrylate), and 5 parts by weight of Dalocure 1173 (product name of a radical initiator manufactured by Ciba Specialty Chemicals) were mixed, and the resulting composition containing no solvent which is liquid at 25° C. was coated on a polycarbonate sheet to a thickness of 5 μm, and the coating was irradiated with a 80 W high-pressure mercury-vapor lamp for 2 seconds (accumulated radiation dose, 200 mJ/cm$^2$) for curing.

The resulting coating exhibited high abrasion resistance with a ΔHaze of 11 in Taber abrasion test (at a load of 500 g and a rotation of 100). The coating also exhibited an acceptable resistance to oil-base felted marker, and excellent smudge proof property with a contact angle with water of 95°, and a contact angle with oleic acid of 64°.

Comparative Example 1

Synthesis of 3-Acryloxypropyl Group-Containing Organopolysiloxaneresin (AP1)

234.0 parts by weight (1.00 mole) of 3-acryloxypropyltrimethoxysilane and 539.7 parts by weight of isopropyl alcohol used for the starting materials were charged in the reaction vessel, and when these materials were homogeneously mixed, 12.6 parts by weight of 20% by weight methanol solution of tetramethyl ammonium hydroxide and 108.8 parts by weight of water (6.04 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product was liquid at 25° C., and it had a volatile content of 0.3% by weight, a refractive index of 1.4805, an OH content of 0.4% by weight, and a weight average molecular weight of 3,000. Analysis by infrared absorption spectrometry and nuclear magnetic resonance of this reaction product revealed that the hydrolysis and condensation had proceeded in theoretical manner, and the resulting product was an organopolysiloxane resin containing a photoreactive group comprising the siloxane unit represented by the formula:

$$[Ac2SiO_{3/2}]_{1.0}[OH]_{0.03}$$

[wherein Ac2 represents 3-acryloxypropyl].

50 parts by weight of the resulting compound, 50 parts by weight of 1,6-hexanediol diacrylate (a difunctional acrylate), and 5 parts by weight of Dalocure 1173 (product name of a radical initiator manufactured by Ciba Specialty Chemicals) were mixed, and the resulting composition containing no solvent which is liquid at 25° C. was coated on a polycarbonate sheet to a thickness of 5 μm, and the coating was irradiated with a 80 W high-pressure mercury-vapor lamp for 2 seconds (accumulated radiation dose, 200 mJ/cm$^2$) for curing.

The resulting coating exhibited insufficient abrasion resistance with a ΔHaze of 33 in Taber abrasion test (at a load of 500 g and a rotation of 100). Contact angle with water was 810.

Comparative Example 2

Synthesis of Acryloxymethyl Group-Containing Organopolysiloxane Resin (AP2)

187.2 parts by weight (0.80 mole) of 3-acryloxypropyltrimethoxysilane, 46.3 parts by weight (0.20 mole) of 3-acryloxypropylmethyldimethoxysilane, and 539.7 parts by weight of isopropyl alcohol used for the starting materials were charged in the reaction vessel, and when these materials were homogeneously mixed, 13.2 parts by weight of 20% by weight methanol solution of tetramethyl ammonium hydroxide and 108.8 parts by weight of water (6.04 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product was liquid at 25° C., and it had a volatile content of 0.8% by weight, a refractive index of 1.4835, an OH content of 0.63% by weight, and a weight average molecular weight of 2,800. Analysis by infrared absorption spectrometry and nuclear magnetic resonance of this reaction product revealed that the hydrolysis and condensation had proceeded in theoretical manner, and the resulting product was an organopolysiloxane resin containing a photoreactive group comprising the siloxane unit represented by the formula:

$$[Ac2SiO_{2/2}]_{0.2}[Ac2SiO_{3/2}]_{0.8}[OH]_{0.045}$$

[wherein Ac2 represents 3-acryloxypropyl].

100 parts by weight of the resulting compound and 5 parts by weight of Dalocure 1173 (product name of a radical initiator manufactured by Ciba Specialty Chemicals) were mixed, and the resulting composition containing no solvent which is liquid at 25° C. was coated on a polycarbonate sheet to a thickness of 5 μm, and the coating was irradiated with a 80 W high-pressure mercury-vapor lamp for 2 seconds (accumulated radiation dose, 200 mJ/cm²) for curing.

The resulting coating exhibited insufficient abrasion resistance with a ΔHaze of 21 in Taber abrasion test (at a load of 500 g and a rotation of 100). Contact angle with water was 79°.

Comparative Example 3

Synthesis of 3-Acryloxypropyl Group and Fluorine-Containing Organopolysiloxane Resin (AP3)

226.8 parts by weight (0.97 mole) of 3-acryloxypropyltrimethoxysilane, 19.3 parts by weight (0.03 mole) of HFPO3Si(OMe)$_3$ [wherein HFPO3 represents $C_3F_7OC(CF_3)FCF_2OC(CF_3)FCH_2OC_3H_6$—], and 608.5 parts by weight of isopropyl alcohol used for the starting materials were charged in the reaction vessel, and when these materials were homogeneously mixed, 13.8 parts by weight of 20% by weight methanol solution of tetramethyl ammonium hydroxide and 97.0 parts by weight of water (6.04 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product was liquid at 25° C., and it had a volatile content of 0.6% by weight, a refractive index of 1.4717, an OH content of 0.56% by weight, and a weight average molecular weight of 2,200. Analysis by infrared absorption spectrometry and nuclear magnetic resonance of this reaction product revealed that the hydrolysis and condensation had proceeded in theoretical manner, and the resulting product was an organopolysiloxane resin containing a photoreactive group comprising the siloxane unit represented by the formula:

$$[Ac2SiO_{3/2}]_{0.97}[HFPO3SiO_{3/2}]_{0.03}[OH]_{0.04}$$

[wherein Ac2 represents 3-acryloxypropyl, and HFPO3 represents $C_3F_7OC(CF_3)FCF_2OC(CF_3)FCH_2OC_3H_6$—].

60 parts by weight of the resulting resin, 40 parts by weight of 1,6-hexanediol diacrylate (a difunctional acrylate), and 5 parts by weight of Dalocure 1173 (product name of a radical initiator manufactured by Ciba Specialty Chemicals) were mixed, and the resulting composition containing no solvent which is liquid at 25° C. was coated on a polycarbonate sheet to a thickness of 5 μm, and the coating was irradiated with a 80 W high-pressure mercury-vapor lamp for 2 seconds (accumulated radiation dose, 200 mJ/cm²) for curing.

The resulting coating had a large contact angle with water of 99° and a large contact angle with oleic acid of 64°. The resistance to oil-base felted marker, however, was unacceptable, and the smudge proof property was also insufficient. Also, the abrasion resistance was rather insufficient with a ΔHaze of 20 in Taber abrasion test (at a load of 500 g and a rotation of 100).

Comparative Example 4

3-Acryloxypropyl Group and Fluorine-Containing Organopolysiloxane Resin (AP4)

224.6 parts by weight (0.96 mole) of 3-acryloxypropyltrimethoxysilane, 19.3 parts by weight (0.03 mole) of HFPO3Si(OMe)$_3$ [wherein HFPO3 represents $C_3F_7OC(CF_3)FCF_2OC(CF_3)FCH_2OC_3H_6$—], 0.9 parts by weight (0.0008 mole) of MD-10, and 612.7 parts by weight of isopropyl alcohol used for the starting materials were charged in the reaction vessel, and when these materials were homogeneously mixed, 13.9 parts by weight of 20% by weight methanol solution of tetramethyl ammonium hydroxide and 97.0 parts by weight of water (6.04 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product was liquid at 25° C., and it had a volatile content of 0.5% by weight, a refractive index of 1.4829, an OH content of 0.6% by weight, and a weight average molecular weight of 3,000. Analysis by infrared absorption spectrometry and nuclear magnetic resonance of this reaction product revealed that the hydrolysis and condensation had proceeded in theoretical manner, and the resulting product was an organopolysiloxane resin containing a photoreactive group comprising the siloxane unit represented by the formula:

$$[Me_2SiO_{2/2}]_{0.01}[Ac2SiO_{3/2}]_{0.96}[HFPO3SiO_{3/2}]_{0.03}[OH]_{0.043}$$

[wherein Ac1 represents acryloxypropyl and HFPO3 represents $C_3F_7OC(CF_3)FCF_2OC(CF_3)FCH_2OC_3H_6$—].

60 parts by weight of the resulting compound, 40 parts by weight of 1,6-hexanediol diacrylate (a difunctional acrylate), and 5 parts by weight of Dalocure 1173 (product name of a radical initiator manufactured by Ciba Specialty Chemicals) were mixed, and the resulting composition containing no solvent which is liquid at 25° C. was coated on a polycarbonate sheet to a thickness of 5 μm, and the coating was irradiated with a 80 W high-pressure mercury-vapor lamp for 2 seconds (accumulated radiation dose, 200 mJ/cm²) for curing.

The resulting coating had an acceptable resistance to oil-base felted marker and sufficient smudge proof property with the contact angle with water of 97° and the contact angle with oleic acid of 67°. However, the abrasion resistance was rather insufficient with a ΔHaze of 17 in Taber abrasion test (at a load of 500 g and a rotation of 100).

Comparative Example 5

Synthesis of 3-Acryloxypropyl Group and Fluorine-Containing Organopolysiloxane Resin (AP5)

227.0 parts by weight (0.96 mole) of 3-acryloxypropyltrimethoxysilane, 17.0 parts by weight (0.03 mole) of $C_8F_{17}C_2H_4Si(OMe)_3$, 1.1 parts by weight (0.0011 mole) of MD-10, and 715.7 parts by weight of isopropyl alcohol used for the starting materials were charged in the reaction vessel, and when these materials were homogeneously mixed, 16.1 parts by weight of 20% by weight methanol solution of tetramethyl ammonium hydroxide and 108.2 parts by weight of water (6.04 moles of water) corresponding to twice molar amount of the alkoxy group were added, and the mixture was stirred at 25° C. for 12 hours. Toluene was added to the mixture, and after washing the mixture with water followed by neutralization, alcohol, toluene, and the like were removed by distillation.

The reaction product was liquid at 25° C., and it had a volatile content of 0.6% by weight, a refractive index of 1.4690, an OH content of 0.4% by weight, and a weight average molecular weight of 3,400. Analysis by infrared absorption spectrometry and nuclear magnetic resonance of this reaction product revealed that the hydrolysis and condensation had proceeded in theoretical manner, and the resulting product was an organopolysiloxane resin containing a photoreactive group comprising the siloxane unit represented by the formula:

$$[Me_2SiO_{2/2}]_{0.01}[Ac2SiO_{3/2}]_{0.96}[C_8F_{17}C_2H_4SiO_{3/2}]_{0.03}[OH]_{0.03}$$

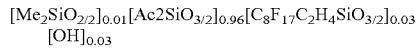

60 parts by weight of the resulting compound was mixed with 40 parts by weight of 1,6-hexanediol diacrylate (a difunctional acrylate), and 5 parts by weight of DAROCUR 1173 (product name of a radical initiator manufactured by Ciba Specialty Chemicals), and the resulting solventless composition which was liquid at 25° C. was coated on a polycarbonate sheet to a thickness of 5 μm. The coating was irradiated with a 80 W high-pressure mercury-vapor lamp for 2 seconds (accumulated radiation dose, 200 mJ/cm²) for curing.

The resulting coating had an acceptable resistance to oil-base felted marker with a contact angle with water of 1010 and a contact angle with oleic acid of 64°, and the smudge proof property was also sufficient. However, the coating exhibited insufficient abrasion resistance with a ΔHaze of 30 in the Taber abrasion test (at a load of 500 g and a rotation of 100).

Japanese Patent Application No. 2006-288607 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A photocurable and thermosetting coating composition which is solventless and liquid at room temperature comprising:
   a silicone resin represented by a siloxane unit of the following formula (1):

(1)

wherein X is hydrogen atom or an alkyl group containing 1 to 4 carbon atoms; $R^1$ to $R^6$ are respectively at least one monovalent organic group which is a monovalent aliphatic hydrocarbon group containing 1 to 6 carbon atoms or a monovalent aromatic hydrocarbon group containing 6 to 10 carbon atoms optionally substituted with a substituent selected from phenyl group, fluorine atom, chlorine atom, bromine atom, (meth) acryloxy group, epoxy structure-containing group, mercapto group, isocyanate group, amino functional group, perfluoroalkyl group, and poly(hexafluoropropylene oxide) structure-containing group; with the proviso that at least one of the $R^1$ to $R^6$ is a group represented by the following formula (2):

$$CH_2=C(R^7)COOCH_2— \quad (2)$$

wherein $R^7$ is hydrogen atom or methyl group; and that the amount of the siloxane unit substituted by the organic group represented by the formula (2) is 20 to 100% by mole of all siloxane units; a is on average 0≦a<0.4; b is on average 0≦b<0.5; c is on average 0<c≦1; d is on average 0≦d<0.4; e is on average 0≦e<0.2; and a+b+c+d=1,
   wherein the silicone resin contains a siloxane unit substituted by a group containing poly(hexafluoropropylene oxide) structure at an amount of 0.1 to 20% by mole of all siloxane units and a siloxane unit substituted by methyl group at an amount of 1 to 10% by mole of all siloxane units.

2. The coating composition according to claim 1 wherein content of the siloxane unit containing the organic group represented by the formula (2) (A % by mole) and content of the siloxane unit containing the organic group represented by the formula (3):

(3)

wherein $R^8$ is hydrogen atom or methyl group (B % by mole) are in the relation:

3. The coating composition according to claim 1 wherein the silicone resin has a weight average molecular weight of 1,000 to 5,000.

4. The coating composition according to claim 1 wherein the silicone resin has a silanol group content of up to 2% by weight.

5. The coating composition according to claim 1 wherein the silicone resin has a volatile content of less than 1% by weight.

6. The coating composition according to claim 1 further comprising a polyfunctional (meth)acryl compound.

7. The coating composition according to claim 1 further comprising at least one member selected from photocuring catalyst, radical polymerization catalyst, and thermal condensation catalyst.

8. An article having formed thereon a coating formed by applying and curing a photocurable and thermosetting coating composition which is solventless and liquid at room temperature comprising:

a silicone resin represented by a siloxane unit of the following formula (1):

$$(R^1R^2R^3SiO_{1/2})_a(R^4R^5SiO_{2/2})_b(R^6SiO_{3/2})_c(SiO_{4/2})_d(O_{1/2}X)_e \quad (1)$$

wherein X is hydrogen atom or an alkyl group containing 1 to 4 carbon atoms; $R^1$ to $R^6$ are respectively at least one monovalent organic group which is a monovalent aliphatic hydrocarbon group containing 1 to 6 carbon atoms or a monovalent aromatic hydrocarbon group containing 6 to 10 carbon atoms optionally substituted with a substituent selected from phenyl group, fluorine atom, chlorine atom, bromine atom, (meth) acryloxy group, epoxy structure-containing group, mercapto group, isocyanate group, amino functional group, perfluoroalkyl group, and poly(hexafluoropropylene oxide) structure-containing group; with the proviso that at least one of the $R^1$ to $R^6$ is a group represented by the following formula (2):

$$CH_2=C(R^7)COOCH_2— \quad (2)$$

wherein $R^7$ is hydrogen atom or methyl group; and that the amount of the siloxane unit substituted by the organic group represented by the formula (2) is 20 to 100% by mole of all siloxane units; a is on average $0 \leq a < 0.4$; b is on average $0 < b < 0.5$; c is on average $0 < c \leq 1$; d is on average $0 \leq d < 0.4$; e is on average $0 \leq e < 0.2$; and a+b+c+d=1, wherein the silicone resin contains a siloxane unit substituted by a group containing poly(hexafluoropropylene oxide) structure at an amount of 0.1 to 20% by mole of all siloxane units and a siloxane unit substituted by methyl group at an amount of 1 to 10% by mole of all siloxane units; and at least one member selected from photocuring catalyst, radical polymerization catalyst, and thermal condensation catalyst.

* * * * *